United States Patent [19]

Cascio, Sr. et al.

[11] Patent Number: 4,754,343
[45] Date of Patent: Jun. 28, 1988

[54] METHOD AND APPARATUS FOR ALIGNING COMPUTER DISK DRIVES

[75] Inventors: Richard H. Cascio, Sr., Danville; Thomas L. Clark, Stockton, both of Calif.

[73] Assignee: Richard H. Cascio, Sr., Danville, Calif.

[21] Appl. No.: 884,096

[22] Filed: Jul. 10, 1986

[51] Int. Cl.$^4$ .......................... G11B 27/36; G11B 5/56
[52] U.S. Cl. ........................................ 360/31; 360/25; 360/77; 360/67
[58] Field of Search ....................... 360/75, 77, 78, 67, 360/137, 25, 31

[56] References Cited

U.S. PATENT DOCUMENTS 4,477,849  10/1984  Berger ................................... 360/77
4,513,333   4/1985  Young et al. ......................... 360/77
4,542,428   9/1985  Yanagi .................................. 360/77

*Primary Examiner*—Raymond F. Cardillo
*Assistant Examiner*—Steven R. Garland
*Attorney, Agent, or Firm*—Henry P. Sartorio

[57] ABSTRACT

A low cost easy use alignment device is used to perform radial alignment of a read/write head in a floppy disk drive of a personal computer. The computer holds the read/write head at the alignment track of a special alignment disk. The alignment track as well as the outermost track and an inner track contain all binary "1" bits while all other tracks contain no data. The alignment device contains an amplifier to amplify the signal read by the read/write head. The signal is detected at the output of the first read amplification stage of the disk drive. The alignment device amplifier signal is displayed on an indicator. A dot/bar display driver with light emitting diodes connected to the outputs is used as an indicator. The stepper motor or head carriage assembly is moved to maximize the indicator signal which corresponds to the optimum radial alignment of the read/write head. A hysteresis check may be performed by stepping the head from the inner data track to the alignment track and comparing the indicator signal to the signal obtained when the head is stepped from the outermost data track to the alignment track.

17 Claims, 2 Drawing Sheets

METHOD AND APPARATUS FOR ALIGNING COMPUTER DISK DRIVES

FIELD OF THE INVENTION

This invention relates generally to computer disk drives, and more specifically to a method and apparatus to check, isolate, identify and correct certain hardware problems and malfunctions with the radial alignment of the read/write head of a floppy disk drive.

BACKGROUND OF THE INVENTION

The computer industry has made extensive use of magnetic disks for data storage, both rigid (or "hard") and flexible (or "floppy") disks or diskettes. Floppy disks, which are commonly used on personal computers (PC's), are generally made of a very thin circular plastic (mylar) base with a magnetic oxide coating placed inside a protective jacket. The standard floppy disk is 5¼" in diameter, although the 3½" disk is also becoming very common. The floppy disks are rotated during operation. Data is generally recorded on a plurality of relatively closely spaced concentric tracks. A read/write (R/W) head is selectively moved to selected tracks to read or write data on the tracks.

In magnetic disk drives it is desirable to achieve the highest recording density possible, which is a function of both the number of annular tracks per radial inch of disk surface and the number of bits per inch along each track. The optimum number of tracks on the individual disks is dependent on the precision of the head positioning system and on the precision in the alignment of the various read/write heads in the disk drive.

The track density on the standard 5¼" flexible or floppy disks is typically 48 tracks/inch (TPI) with 40 tracks. The amount of data which may be recorded is dependent upon closer spacing of a larger number of tracks. An 80 track format with 96 TPI is also used. Increasing the number of tracks with closer spacing presents limitations with respect to positioning the read/write head. This is especially true when, as is generally the case, the disks are subject to physical changes which produce dimensional variations as a result of changes in the environment such as temperature or humidity.

The normal procedure for assuring that the read/write heads are in alignment is to place a master alignment disk into the disk drive which has pre-recorded and precisely positioned alignment tracks on the disk surface. Such a pre-recorded alignment disk is commercially available for use in head alignment and is usually referred to as "CE" (Customer Engineer) disk. Through means of special track spacing, or eccentrically written tracks on a master diskette (eccentric relative to the disk drive bore center), or a combination of the two, the track center (of a particular track) is found by zeroing in on the master diskette used as a reference tool. Obviously, errors in recording of the master diskette, degradation due to wear, and environmental factors tend to reduce master diskette accuracy in time even without considering the high level of skill required to ensure desired results in use. By reading the signals from the head, as the head reads the alignment track, and by feeding such signals to a display device, the head can be adjusted until it is in precise tracking engagement with the tracks on the surface of the disk.

With the tendency towards higher track densities in floppy disks, the alignment of the read/write head becomes acute and small dimensional changes in the disk could result in the read/write head actually being positioned over the wrong track. The accuracy requirements for "on track" are such that a very minor positional error can result in the inability to interchange diskettes between drives, and accumulative drift can result in loss of information since tracks written on a unit and stored for a period of time, during which a shift due to wear has occurred, can result in the inability to retrieve that data. A failed read/write head or drift due to wear are major problems with pre-existing systems not amenable to easy, convenient service on location. Removal of a magnetic head carriage from such units creates a major problem with original alignment destroyed by disassembly.

A failure to properly read a specific piece of data when using a computer system raises several questions. One key question is whether or not the read/write head is in proper alignment. To answer this question, skilled service has been required. To determine disk drive alignment, current practices require removal of the drive from the disk system by a skilled serviceman, who connects the drive to an exerciser, inserts an alignment disk, and with an oscilloscope interprets the pattern to determine if the drive alignment is satisfactory for the purpose intended. This requires several hours of down time for the system and the services of a skilled technician with proper equipment. Head alignment is very important since about one-third of computer failures are caused by the disk drive. Most disk drive problems can be corrected by head alignment, motor speed adjustment or cleaning.

Disks for aligning disk drives with an oscilloscope are well known. A flexible magnetic disk with signals varying on either side of a track centerline is disclosed in U.S. Pat. No. 4,084,201 to Hack, et al. These signals are read and interpreted with the aid of an oscilloscope to check and make track adjustment, ascertain disk eccentricity and spindle eccentricity, check functioning of a magnetic head, and adjust the azimuth angle of the head. U.S. Pat. No. 3,593,331 to Connell, et al., discloses an alignment disk with a three-track arrangement that provides a group of signals which may be read with a plurality of read/write heads and interpreted with the aid of an oscilloscope to produce an electrical function representative of disk alignment.

Automatic control systems for maintaining alignment of transducers are disclosed in U.S. Pat. No. 4,068,267 to Inouye; U.S. Pat. No. 4,149,200 to Card; U.S. Pat. No. 4,157,576 to Hack; U.S. Pat. No. 4,190,859 to Kinjo; and U.S. Pat. No. 4,213,148 to Clemens. U.S. Pat. No. 4,223,189 to Yonezawa, et al., discloses obtaining an alignment signal by analyzing signal variation caused by known undulations in the recording track.

An automated alignment system is the Cateye-Signal Intercept Detect for Aligning a Read/Write Head Above a Computer Data Storage Disk, disclosed in U.S. Pat. No. 4,321,636 to Lenz. An example of a portable field test unit used for performing tests on disk drives that is fairly complex and expensive and requires a skilled technician is disclosed in U.S. Pat. No. 4,348,761 to Berger.

Attempts have been made to write a disk in machine-readable code in an off-track manner. These attempts were based on an assumption that if the drive in question could read a track offset by one-half track width, in either direction from a correct track centerline position, the head alignment must be satisfactory. This assumption is erroneous. A signal degrades by fifty percent (50%) of the signal level for a one-half track width offset condition, and most disk drives will produce error-free signals well beyond this offset because the fifty percent (50%) signal level due to off-track conditions is basic to design in that type of device. Thus, such disks with off-track data will be read with failure points determined only by indeterminate system noise.

When the transducer head of the computer disk drive is "out of alignment" then the disk drive must be repaired. Typically, this repair is carried out by a skilled technician using sophisticated and expensive equipment. Generally, an oscilloscope or other specialized and expensive equipment is required, and it is generally time consuming and expensive to carry out this task of realigning the transducer head relative to the "tracks" on the disk drive. Thus, there has been a continuing need for a small and inexpensive means by which a person with a minimal amount of training can carry out the task of aligning the read/write head of a computer disk drive. With the extremely low cost of currently available floppy disk drives, the need for quick low cost alignment adjustment is particularly acute or it will be cheaper to replace the entire disk drive.

The invention is directed to a simple and inexpensive method and apparatus for radial alignment of the disk drives of computers, in particular the "floppy" disk drives used in personal computers (PC's).

The system of the present invention provides for the precise alignment of the read/write head in the disk drive so that an optimum number of tracks per radial inch of the individual disks may be achieved. This precise alignment can be accomplished by a semi-skilled technician following the relatively simple steps outlined by this invention and using the alignment testing apparatus of this invention.

Thus, this invention solves a long felt need in the computer industry whereby the transducer or read/write heads of disk drives for personal computers can be aligned relatively quickly and easily using the apparatus and method of this invention.

SUMMARY OF INVENTION

Accordingly, it is an object of this invention to provide a simple and inexpensive method and apparatus for radially aligning the read/write heads of computer disk drives.

It is another object to reduce the equipment and steps required to realign the read/write head of a floppy disk drive in a computer.

It is also an object to provide method and apparatus for read/write head alignment with universal application to a variety of different disk drives used in a variety of different computers.

It is a further object to provide method and apparatus which is highly accurate and with which the head alignment can be performed very rapidly.

It is yet another object to provide a simplified circuit means for measuring the optimum output signal of the read amplifier circuit of a personal computer.

Another object of this invention is to provide a pocket-sized device to align disk drives on a computer.

Another object is to provide a simple method of aligning the disk drives on the computer.

Yet another object of this invention is to provide a method and apparatus whereby with minimal training, one can align the disk drives on a personal computer.

This invention provides simple, easy to use method and apparatus for diagnosing and aligning disk drives. The output of the first amplifier in the read amplifier circuit of the disk drive is measured while reading the alignment track of a special test disk. This signal is amplified, filtered, rectified, and displayed in a tester apparatus of this invention so that the signal maximum can be observed. This signal maximum occurs when the read/write head is properly aligned over a track on the disk drive. Accordingly, using the portable hand held tester and making a simple connection to the disk drive circuit enables a relatively unskilled or untrained person to make an accurate diagnosis and easy correction of a disk misalignment problem.

The diagnostic method and apparatus in accordance with the present invention has the advantage of being applicable to all 5¼" floppy disks with a wide range of track densities, and all known formats. The invention can also be applied to other recording media such as other types or sizes of disks and diskettes, as well as tapes, cassettes and drums.

These and other objects and advantages of the present invention will no doubt become obvious to those of ordinary skill in the art after having read the following detailed description of the preferred embodiment which is illustrated in the various drawing figures.

DESCRIPTION OF THE PREFERRED EMBODIMENTS

Figure 1:
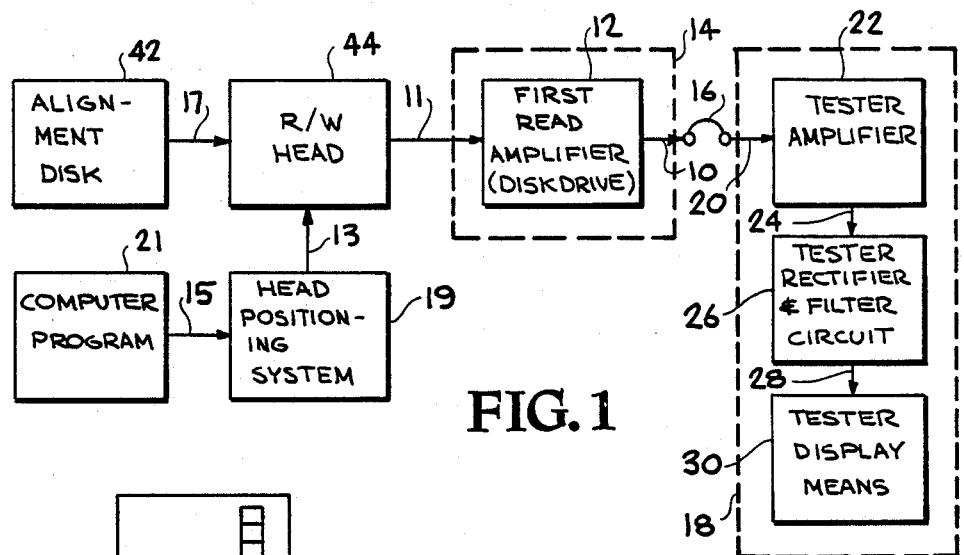
FIG. 1 is a block diagram representation of the tester connected to a disk drive.

The functional steps accordingly to the method of this invention during the alignment testing with the tester device of this invention are as follows, illustrated with reference to FIG. 1:

1. An output signal 10 taken directly after the first "read amplifier" circuit 12 of a computer's disk drive circuit 14, is input through the positive (red) lead 16 of the tester device 18 of this invention as input signal 20 to tester amplifier 22. The input to amplifier circuit 12, is read signal 11 from read/write head 44 which reads a data signal 17 from a special alignment disk 42. Computer 21 runs a program which sends position command signals 15 to head positioning system 19 which positions read/write head 44 by means of drive actuator mechanism 13. Read/write head 44 is positioned over certain preselected data tracks on disk 42, including an alignment track which provides data signal 17.

2. This "input signal" 20 is then amplified by the tester amplifier 22 of tester device 18 up to a desired range, generally 80–400 times amplification, to provide an "amplified input signal" 24.

3. This "amplified input signal" 24 is rectified (generally half-wave rectified) and filtered by rectifier and filter circuit 26 to provide a smooth and constant "rectified and filtered input signal" 28.

4. This "rectified and filtered input signal" 28 is then input into a suitable signal display means 30. This display means 30 can be any of the following: a series of LED's connected in series or in parallel; an "S meter";

and audio-signal generator; a bar indicator graph; or any other known display device; or a combination of these. All of the display means have the purpose of providing a visual and/or audio output whereby one can tell that the "rectified and filtered input signal" 28 has increased and/or decreased in magnitude.

By these steps, the magnitude of the output signal 10 from the first read amplifier circuit 12 of the computer disk drive 14 can be measured as it varies so that one can detect the maximum magnitude signal. The magnitude of this output signal is a direct measure of the position of the read/write head over a particular track on the surface of the floppy disk in the disk drive. A maximum magnitude signal will indicate the optimum radial alignment of the read/write head over the track on the floppy disk.

Figure 2:
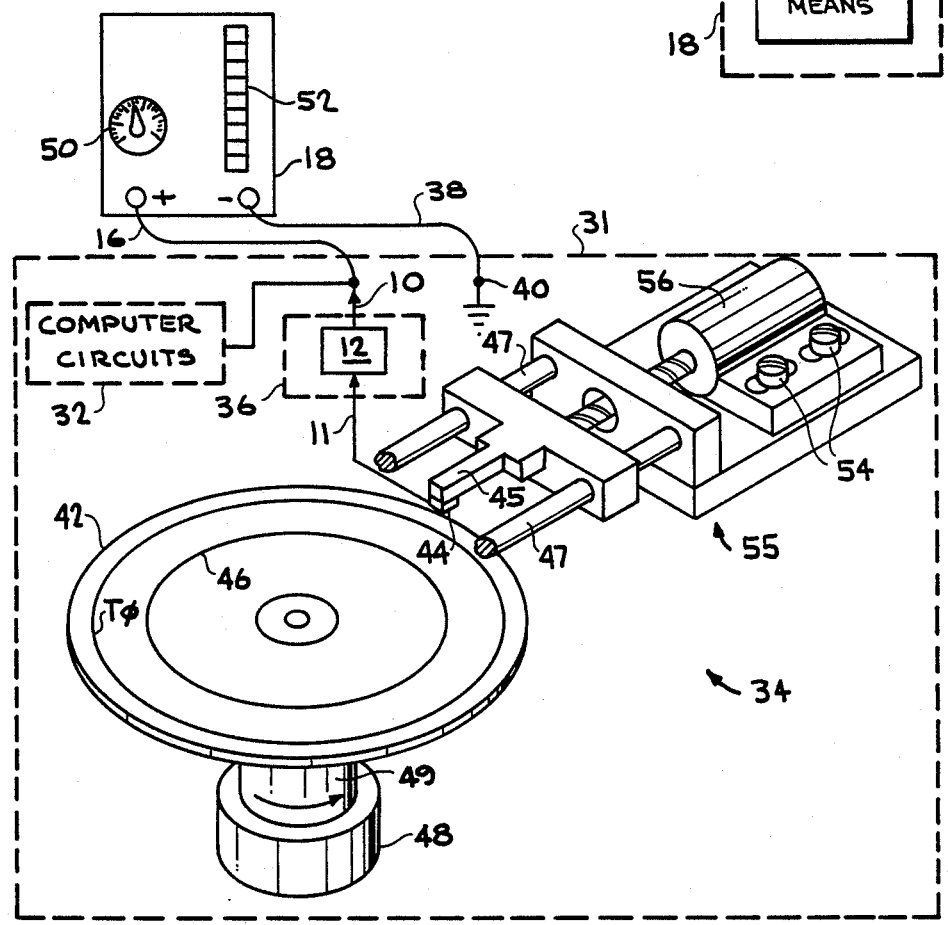
FIG. 2 is a schematic view of a tester connected to a disk drive.

The process of realigning a PC disk drive by this invention is carried out, as an example, by the following operational steps, illustrated with reference to FIG. 2:

(1) Access the disk drive. There are two types of drives. Some drives are separate units from the computer and easy to access. Other drives are built into the computer and more difficult to access. Remove the protective housing and covers of the computer 31 to expose both the computer circuits 32 and the floppy disk drive 34 with its analog board 36.

(2) Load the computer with a program which will step the read/write head 44 to any specified track on the disk and keep the disk spinning during the alignment procedure. Insert the customized "alignment test" floppy disk 42 used with this invention into the disk drive 34 being tested. The operation of the program with this special disk keeps the read/write head 44 maintained at a fixed position over a specified track 46, the "alignment track", of the disk, rather than having the head retracting when it is not reading or writing on the disk. A preferred disk 42 has three data tracks which provide a signal (all "1"s). The remaining tracks have no data and produce no signal. The three data tracks are in a preferred embodiment of the outermost track, generally called track zero (T∅); an intermediate track T16); and an inside track (T34). Since the signal is strongest on the outer tracks and weakest on the inner tracks, the intermediate track T16 is used as the "alignment track" for balance. Start with head 44 positoned at T∅. (T∅ is used as a reference position since the drive controller always knows when it is at T∅ by means of a detector).

(3) Attach the negative (black) lead 38 of the alignment tester device 18 to a ground 40 of the computer circuits.

(4) Attach the positive (red) lead 16 of the alignment tester device 18 of this invention to the output signal 10 from the first amplifier stage 12 of the read signal on the analog board 36 of the floppy disk drive 34 to be tested. All computer disk drives have an amplifier circuit on the "read" portion of the circuit.

(5) With the head 44 at track T∅, calibrate indicator 52 by adjusting the dashpot 50 controlling the tester gain of the alignment tester device 18 until the output signal of indicator 52 of the device shows a reading of approximately 70%–80% of the maximum possible reading of the indicator signal.

(6) The computer can be used to move head 44 to a non-data track to verify that the indicator signal goes off; then return to T∅ so that indicator signal goes back on. Move the read/write head 44 to the particular "alignment" track 46 (T16) of the floppy disk 42 (while the spindle motor 48 of the disk drive 34 keeps rotating) and recalibrate for 70–80% of the indicator maximum.

(7) Perform the mechanical adjustments. The disk drive 34 has a read/write head 44 housed in a read/write head carriage assembly 45 which slides on a pair of rails 47. Stepper motor 56 causes read/write head 44 to move radially from track to track. The stepper motor 56 moves head assembly 45 through a drive actuator mechanism 55. The most common types of drive actuator mechanisms are the band actuated type in which the stepper motor turns a cam which is connected to the head assembly by a split band; the worm gear lead screw type (shown in FIG. 2) in which the head assembly engages a lead screw turned by the stepper motor; and the spiral disk type in which the stepper motor turns a disk with a spiral grove which is engaged by a metal pin from the head assembly. The radial alignment involves repositioning the read/write head 44 on rails 47 so that head 44 is directly over (or under) track 46. Typically the mechanical adjustment involves turning the stepper motor, laterally moving the stepper motor, rotating the cam relative to the stepper motor, or moving the head carriage assembly, or moving the read/write head relative to the assembly. As an illustration, loosen the means 54 (locking nuts, screws, nuts, bolts, etc.) that secures and fixes the stepper motor 56 (or the head carriage assembly 45) of the disk drive 34 being tested, so that the stepper motor 56 (or the head carriage assembly 45) can be moved to reposition the read/write head 44 in a radial direction relative to the floppy disk 42 rotating on the spindle 49. Then move the loosened stepper motor 56 or the head carriage assembly 45 ever so slightly until output indicator 52 on the tester device 18 displays a signal maximum, and then retighten the means 54 holding the stepper motor in its fixed position.

(8) In step 7, if the output indicator signal reads the maximum signal capable for the indicator 52, then recalibrate so that the indicator is not "pegged" and the maximum signal is kept within the range of indicator 52, and continue until the best alignment position is found. Once the alignment of the drive is performed (stepping from T∅ to T16) a check for hysteresis should be done. The head 44 should be stepped to a higher track (T34) and then back to T16. If the same (maximum) indicator signal is obtained when the alignment track is reached from both directions, there is no hysteresis problem and the alignment is finished. However, if there is a difference in the indicator signal, then the alignment can be readjusted to compensate for the hysteresis (mechanical slop). The best alignment position in this case will be found by repositioning the head so the maximum signal is decreased in one direction and increased in the other direction so that the signals in the two directions approximately coincide. Thus the alignment is slightly worsened in one direction so that it can be improved in the other direction.

(9) Repeat steps 1–8 for each disk drive to be tested.

(10) Turn off device and computer.

(11) Disconnect the leads of the device attached to the circuits.

(12) Return housing and cover to protection position of computer or disk drive unit.

(13) Disengage and remove the customized "alignment test" floppy disk from the drive that was tested.

(14) Reload desired software into computer and resume computer operations.

These steps are generally descriptive of the functions and sequence of events that typically take place in using the method and device of this invention to realign or test the alignment of a computer disk drive.

Figure 3:
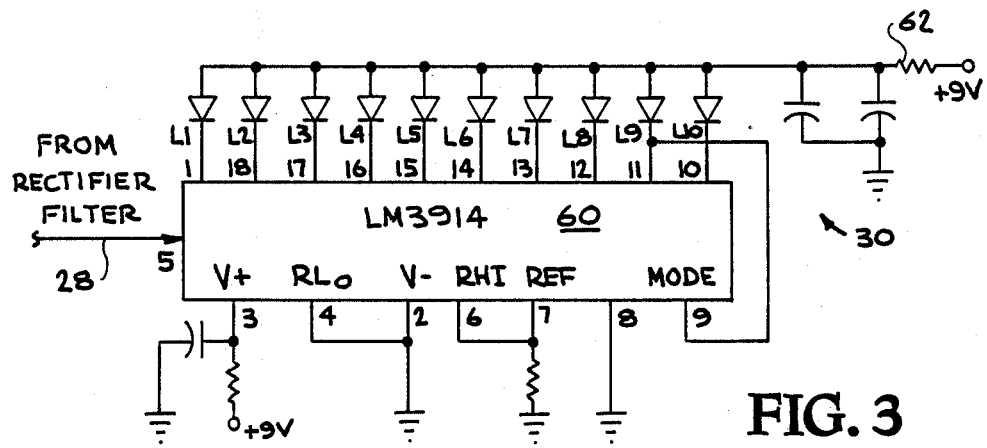
FIG. 3 is a schematic diagram of a display circuit.
Figure 4:
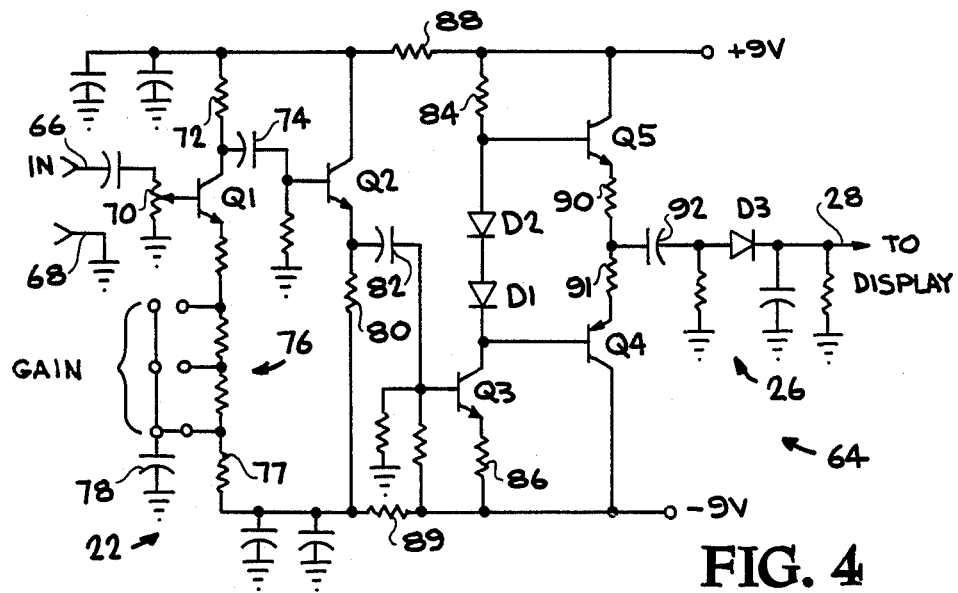
FIG. 4 is a schematic diagram of an amplifier and rectifier/filter circuit.
Figure 5:
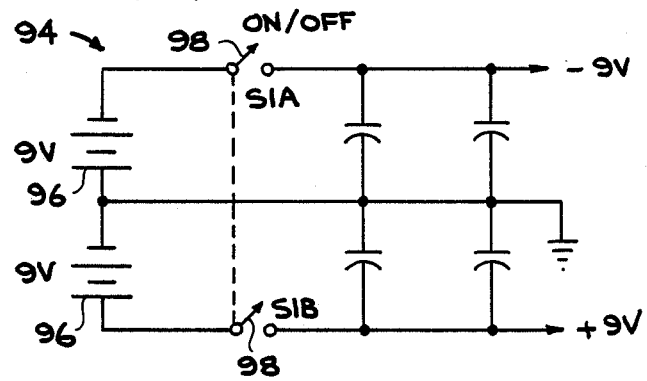
FIG. 5 is a schematic diagram of a power supply.

A preferred embodiment of this invention utilizes circuits of FIGS. 3, 4, and 5. A preferred display means utilizes an integrated circuit dot/bar display driver, LM-3914, manufactured by National Semiconductor Corporation, as shown in FIG. 3.

The tester display means 30 shown in FIG. 3 utilizes a dot/bar display driver 60 to produce an easy-to-read bargraph display. Driver 60 is powered by a voltage of +9 V applied to pin 3 through an R-C filter. Signal 28 from tester rectifier/filter circuit 26 is input into display driver 60 at pin 5. In this application, pins 2, 4, 8 of display driver 60 are grounded and pins 6, 7 are connected together and grounded through a resistor. Internally, driver 60 contains a precision voltage-divider chain which divides a reference voltage into a series of ten steps. Each of these voltages is input into a separate comparator and compared to the signal 28. The outputs of these comparators are connected to one of the ten parallel LED's (L1, L2 . . . L9, and L10) which are connected between a +9 V voltage source and pins 1, 18-10 respectively. The voltage is connected through an R-C filter with resistor 62 limiting the current draw of the LED's. Driver 60 is operated in bar mode by applying voltage to pin 9 (which is done by connecting to pin 11). When the signal 28 is greater than the voltage applied to a comparator, the normally high output of that comparator goes low, turning on the respective LED. As signal 28 increases successively higher LED's also turn on producing a bargraph display. Thus tester display means 30 provides a visual bargraph of the signal 28 in ten increments. In order to be able to detect the maximum signal, the level of signal 28 must be adjusted so that it does not exceed the range of driver 60.

The circuit 64 shown in FIG. 4 includes the amplifier circuit 22 and rectifier/filter circuit 26 of FIG. 1 and provides the signal 28 to tester display means 30. The output of the disk drive first read amplifier is input at positive input 66 while ground input 68 is connected to the computer/disk drive ground. The input signal is connected to the base of the transistor Q1 through a potentiometer 70 which functions as an input voltage level adjustment means. The collector of transistor Q1 is connected through resistors 72 and 88 to a +9 V source and also through capacitor 74 to the base of transistor Q2. The emitter of transistor Q1 is connected through several series resistors 76 and resistors 77 and 89 to a −9 V source; resistors 76 are selectively connected through a capacitor 78 to ground to change the gain of circuit 64. In a simplified embodiment, only a single resistor 76 is used and the gain cannot be changed. Transistor Q2 with resistor 80 in series at the emitter is connected in parallel across transistor Q1 and resistors 72, 76 and 77. The emitter of transistor Q2 is also connected through capacitor 82 to the base of transistor Q3. The collector of transistor Q3 is connected through diodes D1, D2 and resistor 84 to the +9 V source, and the emitter of transistor Q3 through resistor 86 to the −9 V source. Transistor Q3 with diodes D1, D2 and resistors 84, 86 are also connected in parallel through resistors 88 and 89 across transistor Q2 and resistor 80. The collector of transistor Q3 is also connected to the base of transistor Q4 and through diodes D1, D2 to the base of transistor Q5. The collector of transistor Q5 is connected to the +9 V source. The emitter of transistor Q5 is connected through a pair of resistors 90 and 91 to the emitter of transistor Q4. The collector of transistor Q4 is connected to the −9 V source. Signal 28 is obtained from the junction between resistors 90 and 91 after passing through filter capacitor 92 and rectifying diode D3. In a preferred embodiment transistors Q1, Q2, Q3, and Q5 are npn transistors 2N3904 while transistor Q4 is a pnp transistor 2N3906 and diodes D1, D2, and D3 are 1N4148 diodes.

The ±9 V sources may be provided by the circuit 94 of FIG. 5 which includes a pair of 9 V batteries 96 in series with a center ground. Switch 98 (double pole) is used to prevent battery drain when the tester device is not being used.

The "read out" devices could also be lamps, S-meters, barmeters, audio signal or tone generators (such as piezo-electric devices), speakers, and similar devices that read out and indicate changes in the magnitude of a signal.

A dash pot or other adjustment means in the amplifier circuit can be utilized if it is desired so that the signal to the "read out" display assembly can be varied where a maximum magnitude signal can be more easily identified by adjusting the signal level so that the maximum signal does not exceed the range of the indicator means.

The "read out" display means can display any or all of the following: the voltage output; the frequency output; the current output; or using a voltage to frequency converter —a tone output. Anyone or a combination of these can provide a desired indication of the read/write head alignment.

Changes and modifications in the specifically described embodiments can be carried out without departing from the scope of the invention which is intended to be limited only by the scope of the appended claims.

We claim:

1. Method of detecting and correcting radial alignment of a read/write head of a disk drive of a computer, comprising: reading an alignment track on an alignment disk mounted in the disk drive, the alignment disk being formed with three data tracks having all binary "1" bits and all remaining tracks with no data; detecting a signal from a first read amplifier of the disk drive; amplifying the detected signal; filtering and rectifying the amplified signal; displaying the rectified signal; adjusting the alignment of the read/write head until the displayed signal is maximized.

2. The method of claim 1 wherein the three data tracks are formed at the outermost track, an intermediate track, and an inner track.

3. The method of claim 2 wherein the intermediate data track is used as the alignment track.

4. The method of claim 3 further including sending position control signals from the computer to position the read/write head at the alignment track.

5. The method of claim 4 further including first positioning the read/write head at the outermost data track and adjusting the magnitude of the amplified signal until the magnitude of the displayed signal is at a preselected level.

6. The method of claim 5 further including calibrating the displayed signal to a preselected level prior to adjusting the alignment of the read/write head.

7. The method of 6 further including moving the read/write head to the inner data track and back to the alignment track after the displayed signal has been maximized, determining the difference between the displayed signal prior to moving from the alignment track to the inner data track and after returning from the inner data track to the alignment track, and readjusting the position of the read/write head to substantially equalize the two values of the displayed signal.

8. The method of claim 1 wherein the alignment of the read/write head is adjusted by moving a stepper motor of the disk drive until the displayed signal is maximized.

9. The method of claim 1 wherein the alignment of the read/write head is adjusted by moving a read/write head carriage assembly of the disk drive until the displayed signal is maximized.

10. Apparatus for use during detection and correction of radial alignment of a read/write head of a disk drive, comprising: input means for inputing a signal from a first read amplifier of the disk drive; amplifier means for amplifying the signal; input signal level adjustment means operationally connected to the amplifier means for adjusting the level of the signal; filtering and rectifying means connected to the amplifier means for filtering and rectifying the signal; display means connected to the filtering and rectifying means for displaying the signal, the display means comprising a dot/bar display driver wherein the amplifier and the filtering and rectifying means form a combination comprising:

a parallel circuit having four branches connected essentially in parallel between two voltage sources;

the first, second and third branches each including a first, second and third npn transistor, respectively; the emitters of each transistor being connected through at least one resistor to one of the voltage sources; the collectors of each transistor being connected through at least one resistor to the other voltage source; the third branch further including a pair of diodes connected in series between the collector and voltage source;

the fourth branch including a fourth and fifth transistor, the emitters being connected together through a pair of resistors, the collectors being connected to the voltage sources;

the collector of the first transistor being connected through a capacitor to the base of the second transistor; the emitter of the second transistor being connected through a capacitor to the base of the third transistor; the collector of the third transistor being connected to the base of the fourth transistor and through the pair of diodes to the base of the fifth transistor;

a filter capacitor and a rectifying diode connected in series to the junction of the pair of resistors between the fourth and fifth transistors;

signal input means connected to the base of the first transistor;

signal output means connected to the rectifying diode and a plurality of light emitting diodes connected to outputs of the driver.

11. The apparatus of claim 10, wherein the fourth transistor is an pnp type transistor and the fifth transistor is a npn type transistor.

12. The apparatus of claim 10 further including a gain control means in the first branch connected between the emitter and the voltage source.

13. The apparatus of claim 10 wherein the input voltage level adjustment means are connected between the signal input means and the base of the first transistor.

14. The apparatus of claim 10 wherein the voltage sources are +9 V and −9 V batteries.

15. Apparatus for detecting radial alignment of a read/write head of a disk drive, comprising: input means for inputing a signal from a first read amplifier of the disk drive; amplifier means for amplifying the signal; input signal level adjustment means operationally connected to the amplifier means for adjusting the level of the signal; filtering and rectifying means connected to the amplifier means for filtering and rectifying the signal; display means connected to the filtering and rectifying means for displaying the signal; and an alignment disk mounted in the disk drive and having three data tracks having all binary "1" bits formed at the outermost track of the disk, an intermediate track of the disk, and an inner track of the disk, the intermediate data track forming an alignment track of the disk, and all remaining tracks with no data.

16. The apparatus of claim 15 wherein the display means comprises a dot/bar display driver and a plurality of light emitting diodes connected to outputs of the driver.

17. The apparatus of claim 15 further including a program stored in the computer which controls the position of the read/write head to selected tracks on the disk.

* * * * *